March 21, 1961
R. M. KROKOS ET AL
2,976,057
BICYCLE TRAINER WHEEL ATTACHMENT
Filed Jan. 7, 1958
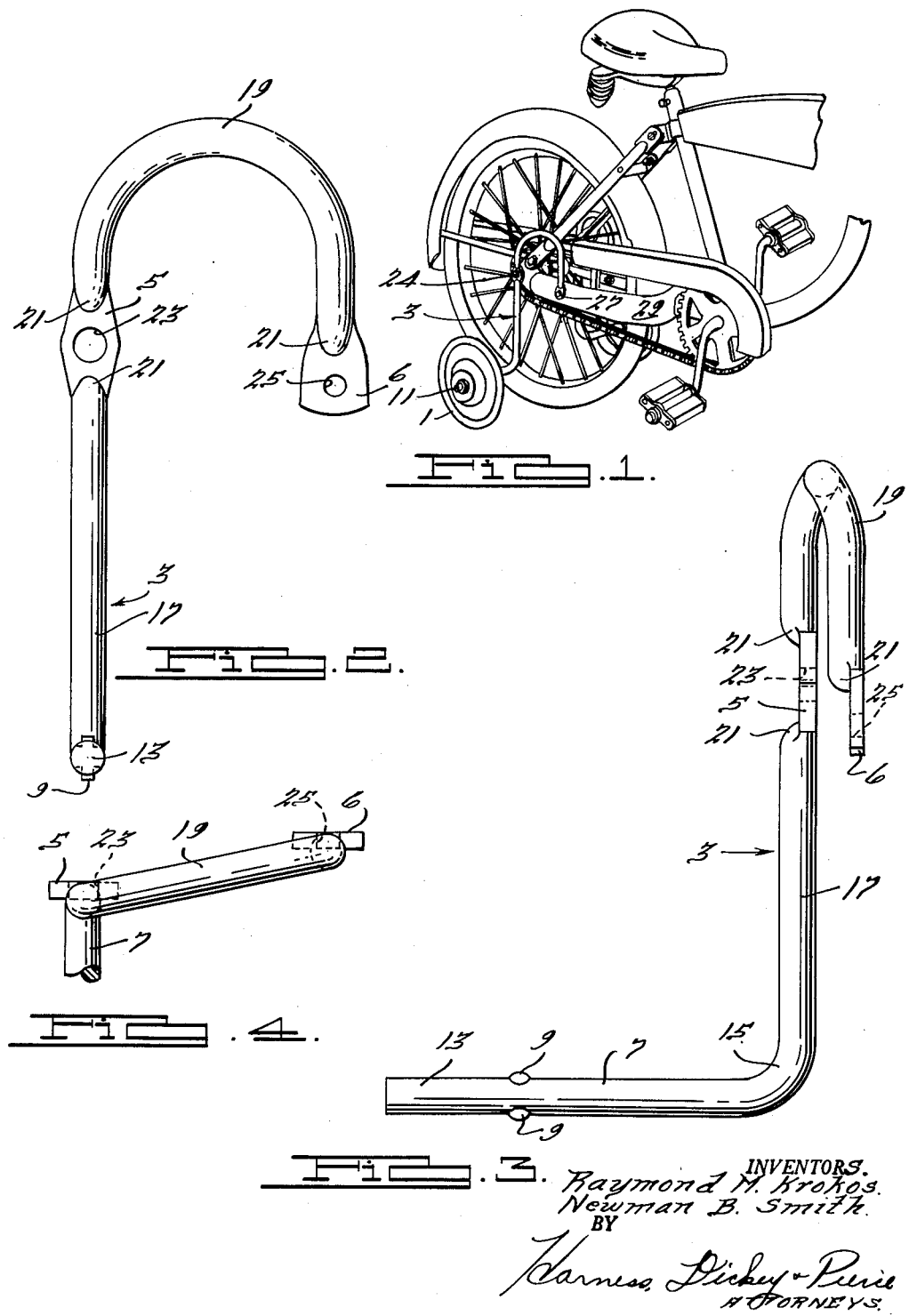
INVENTORS.
Raymond M. Krokos.
Newman B. Smith.
BY
Harness, Dickey & Pierce
ATTORNEYS.

2,976,057

BICYCLE TRAINER WHEEL ATTACHMENT

Raymond M. Krokos, Detroit, and Newman B. Smith, Livonia, Mich., assignors to Evans Products Company, Plymouth, Mich., a corporation of Delaware Filed Jan. 7, 1958, Ser. No. 707,644

1 Claim. (Cl. 280—293)

This invention relates to stabilizing or training wheels for bicycles.

It is an object of this invention to provide an inexpensive trainer wheel construction which will be durable in operation.

In accordance with the invention a single piece of steel rod rotatably carries a wheel and is bent and deformed in a unique manner so that it can be connected at two points to a bicycle.

The invention is illustrated in the accompanying drawings in which:

Figure 1 is a perspective view showing the trainer wheel on the right side of the bicycle;

Fig. 2 is a side elevation of the mounting rod and axle with the wheel removed;

Fig. 3 is a view taken from the right of Fig. 2; and

Fig. 4 is a plan view taken from the top of either Fig. 2 or Fig. 3.

The improved trainer wheel construction of this invention comprises a wheel 1 which is rotatably mounted on and supported by a leg 3. The leg 3 is a single piece construction preferably formed of a length of round metal rod which is flattened at sections 5 and 6. The lower end 7 of the rod extends horizontally to provide an axle upon which the wheel 1 is mounted. Movement of the wheel inwardly on the section 7 is restricted by nibs 9 that are squeezed in the metal of the rod so as to form a section wide enough to engage a washer which in turn will engage the wheel to prevent inward movement. Outward movement of the wheel is prevented by a suitable press-on lock cap 11 well known in the art. Thus, the wheel is rotatably mounted on axle portion 13 of the rod.

There is a right angle bend 15 in the rod connecting the wheel mounting section 7 with a vertical section 17. The flattened area 5 is formed at the top of section 17 and is located so that its outer face is in line with the outside edge of the section 17 as can be seen in Fig. 3. Above the section 5 the leg is curved in substantially a semi-circle to form the section 19. The section 19 is also offset slightly to the outside of the portion 17 as can be seen in Fig. 3. At the end of section 19 is the flattened section 6 which is also in line or tangent to the outside edge of the section 19. It will be noted that the transition from the round cross section of the rod to the flattened sections 5 and 6 is made gradual by the more or less conical portions 21 which project into the flattened areas as seen best in Figs. 2 and 3. This feature provides a gradual change of section modulus and eliminates planes of stress concentration at the flattened sections.

The flattened section 5 has an aperture 23 large enough to fit over the axle 24 of the bicycle. An axle nut is then threaded on the axle to bolt the section 5 tightly against the side of the bicycle. The flattened section 6 has an aperture 25 in it through which a bolt 27 extends to tread into the fork 29 of the bicycle. The two points of support provided by the axle and bolt make the leg rigid and the particular arrangement of section 19 provides a pleasing appearance as well as furnishes a desirable stress distribution in the leg.

If desired, the holes 23 and 25 could be formed as slots so as to permit vertical adjustment of the leg. Alternatively, the hole 23 could be formed as a slot curved about the opening 25 to permit some pivoting of the leg about bolt 27 thus enabling it to be raised or lowered.

We claim:

In a trainer wheel attachment for a bicycle, a leg to support the wheel comprising an integral single piece of metal rod having a horizontal axle section, portions of said axle section being transversely deformed to limit inward movement of the wheel, said leg being bent at the inward end of said axle section to form a vertical section, said vertical section having a flattened portion tangent to the outer surface of the leg, said leg having a portion curved htrough approximately 180° extending upwardly from said vertical section and terminating in a flat portion spaced from said aforementioned flat portion, each said flat portion having an opening therein for attachment to a bicycle.

References Cited in the file of this patent

UNITED STATES PATENTS

| | | |
|---|---|---|
| 661,145 | Hausmann | Nov. 6, 1900 |
| 1,384,300 | Buckland | July 12, 1921 |
| 2,530,498 | Atwood et al. | Nov. 21, 1950 |
| 2,723,133 | Pawsat | Nov. 8, 1955 |
| 2,752,169 | Abel | June 26, 1956 |
| 2,784,008 | Pearl | Mar. 5, 1957 |
| 2,809,052 | Gleissner | Oct. 8, 1957 |

FOREIGN PATENTS

| | | |
|---|---|---|
| 689,864 | France | June 3, 1950 |